United States Patent [19]

Rogier et al.

[11] 3,937,688

[45] Feb. 10, 1976

[54] COPOLYAMIDES FROM AN ISOMERIC MIXTURE OF HEPTADECANE DICARBOXYLIC ACID

[75] Inventors: Edgar R. Rogier, Hopkins; Allan H. Jevne, Anoka; Gerald L. Schwebke, Minneapolis, all of Minn.

[73] Assignee: General Mills Chemicals, Inc., Minneapolis, Minn.

[22] Filed: May 28, 1974

[21] Appl. No.: 473,967

[52] U.S. Cl........ 260/78 R; 260/18 N; 260/33.4 R; 260/78 S
[51] Int. Cl.²........................................ C08G 69/26
[58] Field of Search.................... 260/78 R, 18 N

[56] References Cited

UNITED STATES PATENTS

| | | | |
|---|---|---|---|
| 3,294,759 | 12/1966 | Gabler | 260/78 R |
| 3,475,387 | 10/1969 | Carter et al. | 260/78 R |
| 3,781,234 | 12/1973 | Drawert et al. | 260/78 R |

Primary Examiner—Harold D. Anderson
Attorney, Agent, or Firm—Anthony A. Juettner; Patrick J. Span; Elizabeth Tweedy

[57] ABSTRACT

Copolyamides of a $C_{19}$ diacid, a coacid selected from isophthalic acid, terephthalic acid, alkyl substituted isophthalic acid or esters thereof and a diamine selected from hexamethylene diamine and trimethyl hexamethylene diamine.

6 Claims, No Drawings

COPOLYAMIDES FROM AN ISOMERIC MIXTURE OF HEPTADECANE DICARBOXYLIC ACID

This invention relates to high molecular weight, water insensitive, engineering plastics. More particularly, this invention relates to polyamides which are the condensation product of a diamine component which is hexamethylene diamine or trimethylhexamethylene diamine and an acid component which is a mixture of isophthalic acid, alkyl substituted isophthalic acid or terephthalic acid and a $C_{19}$ diacid having the formula

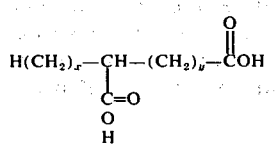

where $x$ is from 1 to 15 and $y$ from 1 to 15 and the total of $x$ and $y$ is 16. In making the polyamides of this invention, the methyl or ethyl esters of the above acids can be used as well as the acids.

BACKGROUND OF INVENTION

Engineering plastics are those that can be molded into shapes such as gear wheels and can retain these shapes against impact and strain. In order to meet these requirements the plastic should not crystallize but remain amorphous. The development of crystallinity in the plastic reduces its resistance to impact. As a rule of thumb, clear plastics are amorphous, while opaque plastics contain a high degree of crystallinity. In addition to remaining amorphous, the plastics must retain their tensile strength to resist breaking under strain. Many plastics which when dry display high tensile strengths lose tensile strength by absorbing small amounts of moisture from the atmosphere, Ideally engineering plastics neither become crystalline nor are sensitive to moisture.

The homopolymers of the $C_{19}$ diacid identified above and hexamethylene diamine are known to the art. It is also known that these homopolymers are sensitive to moisture and after absorbing as little as one half of 1 percent suffer drastic loss of tensile strength.

The homopolymers of isophthalic acid and terephthalic acids and hexamethylene diamine are known. These homopolymers reportedly become crystalline under certain conditions.

SUMMARY OF INVENTION

It has now been found that certain high molecular weight copolyamides wherein the acid component is a mixture of the above-identified $C_{19}$ diacid (also described as heptadecane dicarboxylic acid) and isophthalic acid, terephthalic acid or alkyl substituted isophthalic acid or esters thereof are excellent engineering plastics. Unlike the homopolyamides of $C_{19}$ diacid and hexamethylene diamine or trimethylhexamethylene diamine, they are insensitive to moisture and retain their tensile strength and more important their resistance to deformation as measured by modulus of elasticity even though moisture is absorbed. Unlike the homopolyamides of isophthalic acid or terephthalic acid and hexamethylene diamine, the engineering plastics of this invention do not develop crystallinity. One method of forming these polyamides into engineering articles is to extrude the heated resin into a mold. Upon extrusion, the resin is usually in the form of a ball with air space between it and the sides of the mold. Mechanical pressure is then applied to squeeze the resin into the mold thus forming the resin. The resin is then allowed to cool and the finished article removed from the mold.

The copolyamides can be prepared by conventional methods. In the final condensation product the amine component and the total acid component are present in substantially a 1:1 equivalent ratio. Satisfactory product can be obtained, however, when there is a difference in equivalents of 0 to about 10%. Preferably the individual acid equivalent percentages of the total acid equivalents are about 85 to 20% terephthalic acid, alkyl substituted isophthalic acid wherein the alkyl group has 1 to 12 carbon atoms or isophthalic acid, and about 15 to 80% $C_{19}$ diacid. The copolyamides are of sufficient molecular weight to produce logarithmic viscosity numbers of about 30 to 150 ml./g., and preferably about 40 to 120 ml./g. measured in orthochlorophenol solvent at a concentration of 0.005 g./ml. at a temperature of 30°C. and determined according to ASTM Test Procedure D2857-70.

DETAILED DESCRIPTION OF THE INVENTION

The heptadecane dicarboxylic acids useful in making the polyamide of this invention can be prepared by the addition of carbon monoxide and water to an unsaturated fatty acid, preferably oleic acid. Preparation is shown in Reppe and Kroper, Ann. 582, 63–65 (1953), herein incorporated by reference. The reaction involved is illustrated graphically below:

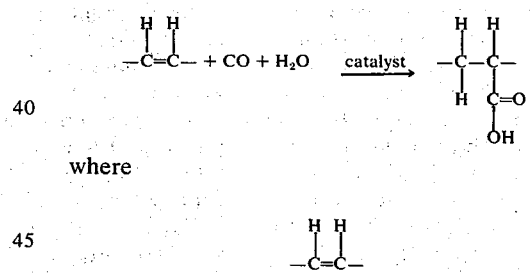

where represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

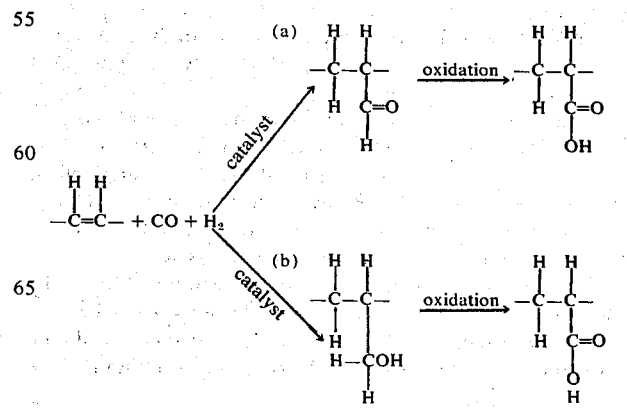

The final acid product is a mixture of isomers having one more carbon atom than the starting material. Starting with a $C_{18}$ unsaturated fatty acid such as oleic acid, the final product will be a mixture of isomers of the $C_{19}$ diacids identified above. The product might also be regarded as a stearic acid substituted with a carboxy group along the fatty chain.

The preferred acid employed in this invention is the $C_{19}$ diacids prepared from the oxonation of oleic acid. However, other $C_{18}$ unsaturated fatty acids such as linoleic, linolenic, ricinoleic and elaidic or mixtures thereof can be employed.

The isophthalic acid, terephthalic acid and alkyl substituted isophthalic acids where the alkyl group (R) contains 1 to 12 carbon atoms included in the polyamides have the respective formulas:

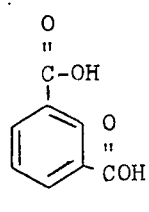
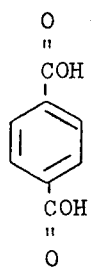
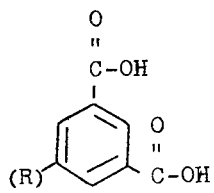

isophthalic acid    terephthalic acid    alkyl substituted isophthalic acid

The above acids, in the form of the acid, or their methyl or ethyl esters, are condensed with the amine component. The amidification reaction can be conducted by the classical melt polymerization technique, for example by heating the dicarboxylic acid and the diamine until substantially complete condensation takes place. The reaction can be completed at a temperature between about 100°C. and 300°C. The reaction is preferably conducted at temperatures between about 100°C. and 300°C. for from about 2.5 to 10 hours, about the last 1 to 2 hours being conducted under vacuum.

A typical heating schedule would appear as follows: Heating the mixture to a temperature of about 180°C. to 250°C. over a period of about 1½ to 4 hours at atmospheric pressure, followed by a period of heating of about 1 to 4 hours at about 250°C. to 270°C. at a partial vacuum of about 15 to 20 mm. Hg. which in turn is followed by a period of about 10 to 30 minutes of heating under a vacuum of about 0.2 to 10 mm. Hg.

It is preferred that the reaction be conducted in the presence of a polymerization catalyst, such as triphenyl phosphite.

Monocarboxylic acids, preferably the fatty acids containing 12 to 18 carbon atoms, more preferably 18 carbon atoms in amounts up to about 1.5 equivalent percent, can be added to the acid component to control molten viscosity. Monocarboxylic aromatic acids such as benzoic acid can be used for this purpose.

The mechanical properties of the polyamides can be characterized on an Instron Tensile Tester Model TTC using ASTM D638-71a and D1708-66 procedures. The polyamide is compression molded into a 6 inches × 6 inches × sheet of approximately 0.04 inch thickness, at a temperature near its melting point (usually a few degrees higher than the melting point) and at 40,000 lbs. load or higher using silicone release agents as the parting agent in the mold. From this sheet, test specimens are die cut for determination of mechanical properties. The test specimen is clamped in the jaws of the Instron Tensile Tester. Cross head speed is usually 0.5 inch/minute for tensile strength, yield strength and percentage elongation measurements according to ASTM procedure D1708-66.

Measurement of modulus of elasticity is determined with a cross head speed of 0.05 inch/minute according to ASTM D638-71a using type IV specimen. The modulus of elasticity was determined on specimens which had been conditioned at 50% relative humidity for 1 week, as well as on specimens desiccated for the same period of time at 0% relative humidity. Comparison of these data reveals the relative moisture sensitivity of a given composition.

In addition to the tensile properties outlined above, the following properties of the polymers were measured:
1. Ball and ring melting point — ASTM E28-67
2. Water absorption — ASTM D570-63
3. Flexural modulus — ASTM D790-66

Set out below are examples of typical preparation procedures of the copolyamides of this invention and the observed measurements of their physical properties. Included in Examples I, II and III for comparative purposes are typical preparations and properties of homopolyamides formed when the $C_{19}$ diacid was condensed with hexamethylene diamine and trimethyl hexamethylene diamine respectively, and isophthalic acid was condensed with hexamethylene diamine. Examples IV, V and VI show typical preparations of the copolyamides from $C_{19}$ diacid, hexamethylene diamine and isophthalic terephthalic and alkyl substituted isophthalic acids, and copolyamides from $C_{19}$ diacid, trimethylhexamethylene diamine and isophthalic and terephthalic acids.

EXAMPLE I

Hexamethylene Diamine and $C_{19}$ Acid Amidification Product: Poly(hexamethylene heptadecane dicarboxyamide)

The following substances were carefully weighed into a 1.5 liter stainless steel reactor designed for pressure operation.

| Reactant | Equivalents | Grams |
| --- | --- | --- |
| Heptadecane dicarboxylic acid* | 2.44 | 402.60 |
| Stearic acid | 0.036 | 10.07 |
| Hexamethylene diamine (1,6) | 2.475 | 214.15 |
| Dow Corning Antifoam A Compound (1% in xylene) | | 0.10 |
| Triphenyl phosphite | | 1.00 |
| Water | | 28.50 |

*The heptadecane dicarboxylic acid was a mixture of isomers predominantly

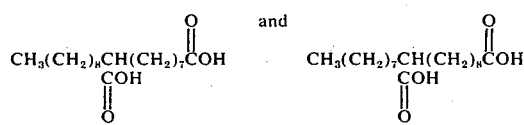

The boiling point of the mixture was 212 to 220°C. and the melting point was 45 to 55°C.

The reactor was sealed and pressurized to 100 psi. with high purity nitrogen gas; then vented to atmospheric pressure. Three such purges insured an inert atmosphere for the reaction. The reactants, in the closed vessel, were heated and stirred. At 150 psi. autogenic pressure and ca. 190°C. slow venting of $H_2O$ vapor was begun. The temperature was raised to 250°C. during the 105 minute venting process. Aspirator vacuum (ca. 20 mm Hg.) was applied to the stirred melt at 260°C. for 98 minutes upon completion of the venting process. Final condensation was effected with a 43 minute application of high vacuum (< mm. Hg.). The vacuum was released by admitting nitrogen gas and the melt was extruded from the reactor. A clear, light colored solid resulted on cooling. The physical properties of the product were measured as described in the specification and the results are shown below:

Physical Properties

| Color | Clear |
| --- | --- |
| Logarithmic Viscosity Number (ml./g.) | 67.2 |
| 24 Hour Water Absorption (%) | 0.540 |
| Equilibrium Water Absorption (%) | 3.30 |
| Tensile Strength at Break (lbf/in²) | 4,200 |
| Tensile Strength at Yield (lbf/in²) | 170 |
| Elongation (%) | 600 |
| Modulus of Elasticity (lbf/in²) | |
| Dry | 5,700 |
| Wet | 500 |
| Flexural Modulus (lbf/in²) | 700 |

EXAMPLE II

Hexamethylene Diamine and Isophthalic Amidification Product: Poly(hexamethylene isophthalamide)

The following substances were carefully weighed into a 1.5 liter stainless steel reactor designed for pressure operation.

| Reactant | Equivalents | Grams |
| --- | --- | --- |
| Isophthalic acid | 3.226 | 270.63 |
| Stearic acid | 0.020 | 5.69 |
| Hexamethylene diamine (1,6) | 3.279 | 281.30 |
| Dow Corning Antifoam A Compound (1% in xylene) | | 0.08 |
| Triphenyl phosphite | | 0.80 |
| Water | | 100.00 |

The amidification reaction was conducted using the procedure of Example I with the following modifications. The venting time was 145 minutes with the temperature rising to 270°C. during that period. Final condensation was accomplished by a 45 minute application of aspirator vacuum at a temperature of 280°C. The physical properties of the product were measured as described in the specification and the results are shown below:

Physical Properties

| Color | Clear |
| --- | --- |
| Logarithmic Viscosity Number (ml./g.) | 81.4 |
| Ball and Ring M.P. (°C.) | 255 |
| 24 Hour Water Absorption (%) | 0.44 |
| Equilibrium Water Absorption (%) | 2.54 |
| Tensile Strength at Break (lbf/in²) | 13,100 |
| Tensile Strength at Yield (lbf/in²) | 13,000 |
| Elongation (%) | 175 |
| Modulus of Elasticity (lbf/in²) | |
| Dry | 309,000 |
| Wet | 294,000 |
| Flexural Modulus (lbf/in²) | 480,000 |

EXAMPLE III

Trimethylhexamethylene Diamine and $C_{19}$ Acid Amidification Product: Poly(trimethylhexamethylene heptadecane dicarboxyamide The following reactants were mixed in a stainless steel reactor designed for pressure operation.

| Reactant | Equivalent | Grams |
| --- | --- | --- |
| Heptadecane dicarboxylic acid* | 2.21 | 364.65 |
| Mixture of 2,4,4 and 2,2,4-trimethyl hexamethylene diamine (1,6) | 2.26 | 178.00 |
| Dow Corning Antifoam A Compound (1% in xylene) | | 0.10 |
| Triphenyl phosphite (catalyst) | | 1.00 |

*Same as in Example I

The amidification reaction was conducted using the procedure of Example I with the following modifications. The venting time was 100 minutes. Aspirator vacuum was applied for a period of 75 minutes. Final condensation was affected during a period of ten minutes.

The physical properties of the product were measured as described in the specification and the results are shown below:

Physical Properties

| Color | Clear |
| --- | --- |
| Logarithmic Viscosity Number (ml./g.) | 70.7 |
| 24 Hour Water Absorption (%) | 0.38 |
| Equilibrium Water Absorption (%) | 1.95 |
| Tensile Strength at Break (lbf/in²) | 4,100 |
| Tensile Strength at Yield (lbf/in²) | 3,800 |
| Elongation (%) | 350 |
| Modulus of Elasticity (lbf/in²) | |
| Dry | 124,000 |
| Wet | 100,000 |
| Flexural Modulus (lbf/in²) | 33,000 |

EXAMPLE IV

$C_{19}$ Diacid, Isophthalic Acid and Hexamethylene Diamine Amidification Products The following substances were carefully weighed into a 1.5 liter stainless steel reactor designed for pressure operation.

| Reactant | 1 Eq. | 1 Gr. | 2 Eq. | 2 Gr. | 3 Eq. | 3 Gr. | 4 Eq. | 4 Gr. |
|---|---|---|---|---|---|---|---|---|
| Heptadecane Dicarboxylic acid* | 0.49 | 80.85 | 1.22 | 201.3 | 1.46 | 239.4 | 2.49 | 410.9 |
| Stearic Acid | 0.011 | 3.03 | 0.0265 | 7.55 | 0.032 | 8.98 | 0.04 | 12.3 |
| Isophthalic Acid | 2.42 | 203.01 | 2.03 | 170.30 | 0.812 | 114.6 | 0.73 | 60.4 |
| Hexamethylene Diamine (aqueous solution) | 2.950 | 250.18 | 3.309 | 282.69 | 1.492 | 127.4 | 3.32 | — |
| Dow Corning Antifoam A Compound (1% in xylene) | — | 0.08 | — | 0.10 | — | 0.08 | — | 0.08 |
| Triphenyl Phosphite | — | 0.80 | — | 1.00 | — | 0.8 | — | 1.2 |
| Water | — | 100.00 | — | 100.00 | — | 100.0 | — | 50.0 |

*Same as in Example I

Sample 1 shows an amidification product wherein the $C_{19}$ diacid is 17 equivalent percent and the isophthalic acid is 83 equivalent percent of the total acid component. Sample 1 was prepared using the procedure of Example I with the following exception. The venting procedure took 135 minutes with the temperature rising to 160°C. during that period. The stirred melt was heated to 270°C. at atmospheric pressure for a period of 125 minutes. Final condensation was effected with a 10 minute aspirator vacuum application.

Sample 2 shows an amidification product wherein the $C_{19}$ diacid is 33 equivalent percent and the isophthalic acid is 67 equivalent percent of the total acid component. Sample 2 was prepared using a procedure of Example I with the following exceptions. The venting process took 150 minutes. The melt was stirred at atmospheric pressure and 270°C. for 145 minutes. Final polymerization was accomplished by a 15 minute application of aspirator vacuum.

Sample 3 shows an amidification product wherein the $C_{19}$ diacid is 65 equivalent percent and isophthalic acid is 35 equivalent percent of the total acid component. Sample 3 was prepared using the procedure of Example I with the following exceptions. The venting process took 113 minutes while the temperature was raised to 250°C. Aspirator vacuum was applied for 40 minutes. Mechanical oil pump vacuum (<1 mm. Hg.) was applied for 110 minutes. The temperature was raised from 250°C. to 270°C. during the final condensation.

Sample 4 shows an amidification product wherein the $C_{19}$ acid is 77 equivalent percent and isophthalic acid is 23 equivalent percent of the total acid component. Sample 4 was prepared using the procedure of Example I with the following exceptions. The venting process took 95 minutes while the temperature was raised to 250°C. Aspirator vacuum was applied for 75 minutes. Mechanical oil pump vacuum (<1 mm. Hg.) was applied for 45 minutes. The temperature was raised from 250°C. to 260°C. during the final condensation.

The physical properties of the above copolyamides were measured and the results are shown below:

Physical Properties

| | Sample 1 | Sample 2 | Sample 3 | Sample 4 |
|---|---|---|---|---|
| Color | Clear | Clear | Clear | Clear |
| Logarithmic Viscosity Number ml./g. | 69.7 | 88.4 | 81.6 | 81.5 |
| Ball and Ring M.P. (°C.) | 269 | 228 | 210 | 220 |
| 24 Hour Water Absorption (%) | 0.39 | 0.49 | 0.52 | — |
| Equilibrium Water Absorption (%) | 21.7 | 3.80 | 3.11 | — |
| Tensile Strength at Break (lbf/in$^2$) | 10,000 | 8,700 | 7,000 | 5,600 |
| Tensile Strength at Yield (lbf/in$^2$) | 12,000 | 8,200 | 7,000 | 3,100 |
| Elongation (%) | 200 | 240 | 320 | 370 |
| Modulus of Elasticity (lbf/in$^2$) Dry | 286,000 | 229,000 | 181,000 | 135,000 |
| Wet | 269,000 | 224,000 | 160,000 | 43,000 |
| Flexural Modulus (lbf/in$^2$) | 396,000 | 290,000 | 210,000 | 158,000 |

EXAMPLE V

$C_{19}$ Diacid, Isophthalic Acid or Terephthalic Acid Trimethylhexamethylene Diamine Amidification Products The following substances were carefully weighed into a 1.5 liter stainless steel reactor designed for pressure operation:

| Reactant | Sample 1 Eq. | Sample 1 Gr. | Sample 2 Eq. | Sample 2 Gr. |
|---|---|---|---|---|
| Heptadecane dicarboxylic acid* | 0.88 | 145.20 | 0.884 | 145.86 |
| Stearic acid | 0.019 | 5.45 | 0.019 | 5.47 |
| Isophthalic acid | 1.38 | 115.77 | — | — |
| Terephthalic acid | — | — | 1.387 | 115.2 |
| Trimethylhexamethylene Diamine (1,6) | 2.302 | 182.07 | 2.313 | 184.80 |
| Dow Corning Antifoam A Compound (1% in xylene) | — | 0.08 | — | 0.08 |
| Triphenyl phosphite | — | 0.8 | — | 0.8 |
| Water | — | 100.00 | — | 100.00 |

*Same as in Example I

Sample 1 shows an amidification product wherein the $C_{19}$ diacid is 39 equivalent percent and isophthalic acid is 61 equivalent percent of the total acid component. Sample 1 was prepared using the procedure of Example I with the following exceptions. The venting process took approximately 130 minutes with the temperature rising to 270°C. during that period. Aspirator vacuum was applied to the stirred melt for 15 minutes. Final condensation was accomplished by a 120 minute application of high vacuum (<1 mm. Hg.) at a temperature of 270°C.

Sample 2 shows an amidification product wherein the $C_{19}$ diacid is 39 equivalent percent and the terephthalic acid is 61 equivalent percent of the total acid component. Sample 2 was prepared using the procedure of Example I with the following exception. The venting process took 167 minutes with the temperature rising to 270°C. during that period. Aspirator vacuum was applied for 35 minutes to the stirred melt, which was heated to 280°C. to complete the condensation.

The physical properties of the products were measured as described in the specification and the results are shown below:

Physical Properties

|  | Sample 1 | Sample 2 |
|---|---|---|
| Color | Clear | Clear |
| Logarithmic Viscosity Number (ml./g.) | 52.8 | 74.0 |
| Ball and Ring M.P. (°C.) | 193 | 222 |
| 24 Hour Water Absorption (%) | 0.27 | 0.32 |
| Equilibrium Water Absorption (%) | 1.55 | 1.62 |
| Tensile Strength at Break (lbf/in²) | 5,200 | 7,400 |
| Tensile Strength at Yield (lbf/in²) | 8,800 | 7,900 |
| Elongation (%) | 80 | 190 |
| Modulus of Elasticity (lbf/in²) |  |  |
| Dry | — | 233,000 |
| Wet | 250,000 | 227,000 |
| Flexural Modulus (lbf/in²) | — | 330,000 |

EXAMPLE VI $C_{19}$ Diacid, t-Butylisophthalic Acid and Hexamethylene Diamine Amidification Product The following substances were carefully weighed into a 1.5 liter stainless steel reactor designed for pressure operation:

| Reactant | Eq. | Gr. |
|---|---|---|
| Heptadecane dicarboxylic acid* | 1.463 | 241.4 |
| Stearic acid | 0.032 | 9.05 |
| 5-t-butylisophthalic acid | 1.988 | 220.27 |
| Hexamethylene diamine (aqueous solution) | 3.518 | 301.84 |
| Dow Corning Antifoam A Compound (1% in xylene) | — | 0.08 |
| Triphenyl phosphite (ca (catalyst) | — | 1.2 |

*Same as in Example I

The amidification reaction was conducted using the procedure of Example I with the following modifications. The venting time was 175 minutes with the temperature rising to 250°C. during that period. Final condensation was accomplished by a 90 minute application of aspirator vacuum at 260°C. followed by mechanical pump vacuum (<1 mm. Hg.) for a period of 35 minutes at the same temperature.

The physical properties of the above copolyamide were measured and the results are shown below:

Physical Properties

| Color | Clear |
|---|---|
| Logarithmic Viscosity Number (ml./g.) | 81.5 |
| Ball and Ring M.P. (°C.) | 220 |
| Tensile Strength at Break (lbf/in²) | 8400 |
| Tensile Strength at Yield (lbf/in²) | 8700 |
| Elongation (%) | 180 |
| Modulus of Elasticity (lbf/in²) |  |
| Dry | 220,000 |
| Wet | 210,000 |
| Flexural Modulus (lbf/in²) | 420,000 |

The embodiments of the invention in which an exclusive property or privilege is claimed are defined as follows:

1. A noncrystalline, moisture insensitive polyamide consisting essentially of an amidification product of an acid component of (a) a mixture of isomers of heptadecane dicarboxylic acid having the formula

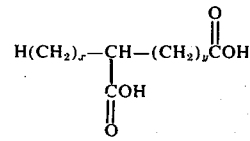

wherein $x$ is an integer from 1 to 15, $y$ is an integer from 1 to 15 and the sum of $x$ and $y$ is 16, and (b) an acid which is isophthalic acid, terephthalic acid, alkyl substituted isophthalic acid wherein the alkyl radical has from 1 to 12 carbon atoms or mixtures thereof; wherein the equivalent percentage of the heptadecane dicarboxylic acid in the acid component is from about 15 to 80% and of the acid which is isophthalic acid, terephthalic acid, alkyl substituted isophthalic acid or mixtures thereof is from about 85 to 20% based on the total acid component; and a diamine component which is hexamethylene diamine, or trimethylhexamethylene diamine, wherein the equivalents of the acid component and the diamine component are substantially equal, wherein the amidification reaction is conducted at a temperature between about 100°C. and 300°C., and wherein the amidification product has a logarithmic viscosity number of about 30 to 150 as measured in orthochlorophenol solvent at a concentration of 0.005 g./ml. by weight and at a temperature of 30°C.

The embodiments of the invention in which an exclusive property or privilege is claimed are defined as follows:

2. The polyamide of claim 1 wherein the logarithmic viscosity number is from about 40 to 120.

3. The polyamide of claim 1 wherein the acid component is heptadecane dicarboxylic acid and isophthalic acid.

4. The polyamide of claim 1 wherein the acid component is heptadecane dicarboxylic acid and terephthalic acid.

5. The polyamide of claim 1 wherein the acid component is heptadecane dicarboxylic acid and alkyl substituted isophthalic acid having the formula

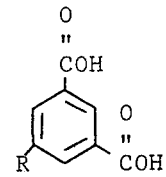

wherein R is an alkyl radical having from 1 to 12 carbon atoms.

6. The polyamide of claim 1 wherein the acid component includes a monocarboxylic acid in an amount up to about 1.5 equivalent percent of the acid component.

* * * * *

UNITED STATES PATENT OFFICE
CERTIFICATE OF CORRECTION

PATENT NO. : 3,937,688
DATED : Feb. 10, 1976
INVENTOR(S) : Edgar R. Rogier, Allan H. Jevne, Gerald L. Schwebke It is certified that error appears in the above-identified patent and that said Letters Patent are hereby corrected as shown below:

Col. 4, line 1 "inches x sheet" should read --inches sheet--

Col. 5, line 33 "(<mm. Hg.)." should read --(<1 mm. Hg.).--

Cols. 7 & 8, line 10 insert --Sample--
Col. 7, line 33 "160°C." should read --260°C.--
Col. 8, line 28 "21.7" should read --2.17--
Col. 11, lines 1, 2 and 3 should be deleted.

Signed and Sealed this

Twenty-eighth Day of September 1976

[SEAL]

Attest:

RUTH C. MASON
Attesting Officer

C. MARSHALL DANN
Commissioner of Patents and Trademarks